March 2, 1954  A. R. MEADORS, JR  2,670,920
APPARATUS FOR FILLING AND WEIGHING RECEPTACLES
Filed Dec. 15, 1952  4 Sheets-Sheet 1

INVENTOR
ANSEL R. MEADORS, JR.

BY

ATTORNEY

March 2, 1954  A. R. MEADORS, JR  2,670,920
APPARATUS FOR FILLING AND WEIGHING RECEPTACLES
Filed Dec. 15, 1952  4 Sheets-Sheet 2

INVENTOR
ANSEL R. MEADORS JR.

BY

ATTORNEY

March 2, 1954  A. R. MEADORS, JR  2,670,920
APPARATUS FOR FILLING AND WEIGHING RECEPTACLES
Filed Dec. 15, 1952  4 Sheets-Sheet 3

INVENTOR
ANSEL R. MEADORS, JR.

BY

ATTORNEY

March 2, 1954  A. R. MEADORS, JR  2,670,920
APPARATUS FOR FILLING AND WEIGHING RECEPTACLES
Filed Dec. 15, 1952  4 Sheets-Sheet 4
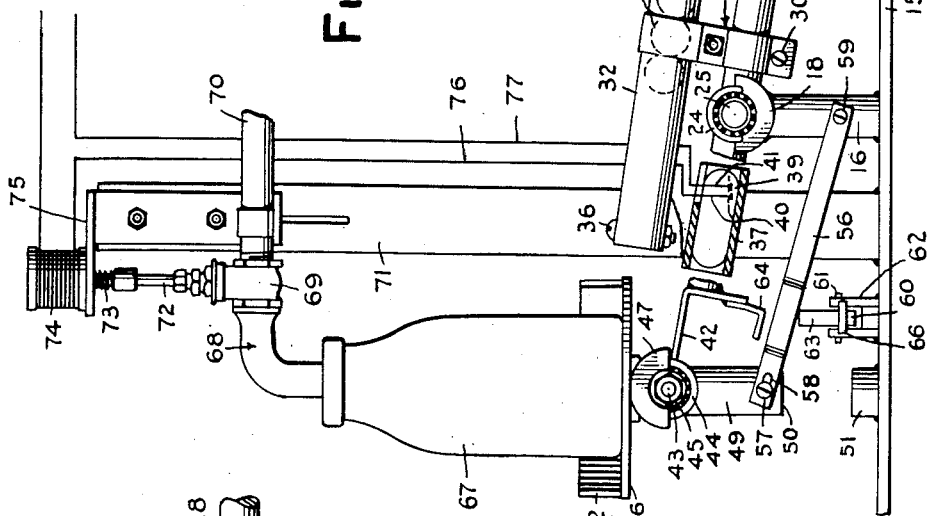
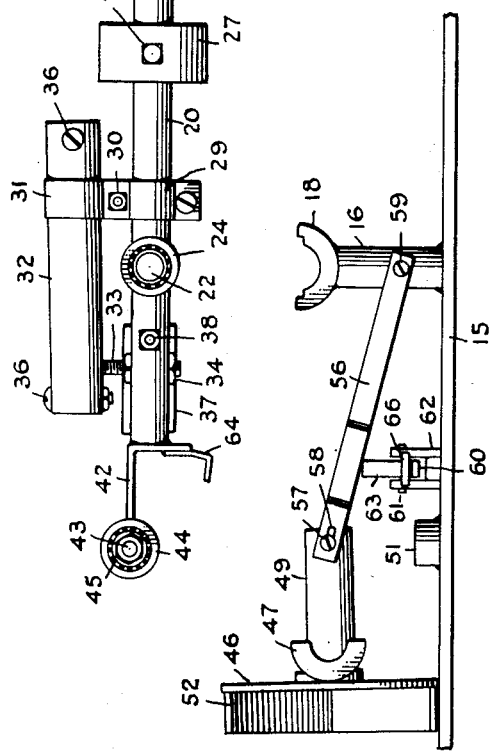
INVENTOR
ANSEL R. MEADORS, JR.
ATTORNEY

UNITED STATES PATENT OFFICE 2,670,920

APPARATUS FOR FILLING AND WEIGHING RECEPTACLES

Ansel R. Meadors, Jr., Greenville, S. C.

Application December 15, 1952, Serial No. 325,979

4 Claims. (Cl. 249—11)

My invention relates to apparatus for filling and weighing receptacles.

A primary object of the invention is to provide a simplified and efficient filling and weighing apparatus for bottles, jars and other receptacles, and adapted to accurately measure or meter with uniformity the amount of liquid introduced into the receptacles from a faucet or the like.

A further object is to provide apparatus of the above-mentioned character which is positive in operation and yet sensitive, the apparatus being adjustable to facilitate filling and weighing of receptacles of various sizes.

A further object is to provide apparatus of the above-mentioned character which is readily dismantled for cleaning, repairs and the like.

Still another object of the invention is to provide apparatus of the mentioned type which is sturdy and durable and inexpensive to manufacture.

Other objects and advantages of the invention will be apparent during the course of the following description.

In the accompanying drawings, forming a part of this application, and in which like numerals are employed to designate like parts throughout the same, Figure 1 is a side elevation of filling and weighing apparatus embodying my invention.

Figure 8 is a further side elevation of the apparatus drawn on a reduced scale and showing the apparatus partly dismantled for cleaning or the like, and Figure 9 is a further fragmentary side elevation of the apparatus and illustrating the operation of the same in conjunction with a dispensing faucet for liquids.

Figure 3:
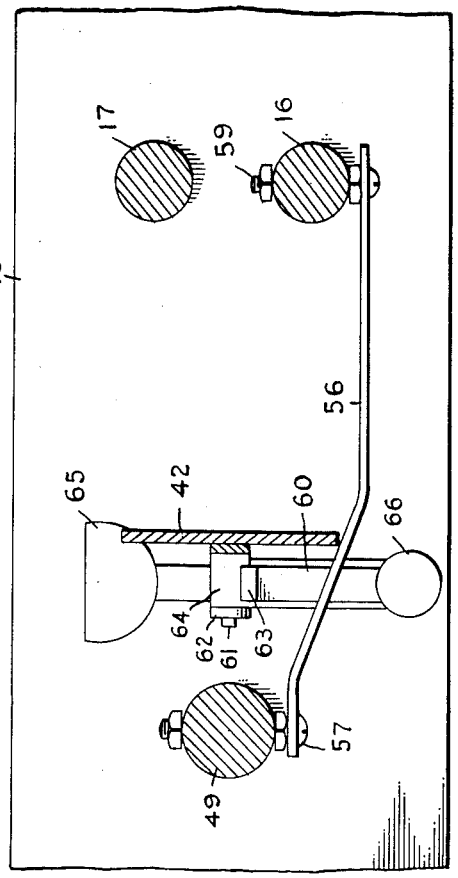
Figure 3 is a horizontal cross section on line 3—3 of Figure 1.
Figure 4:
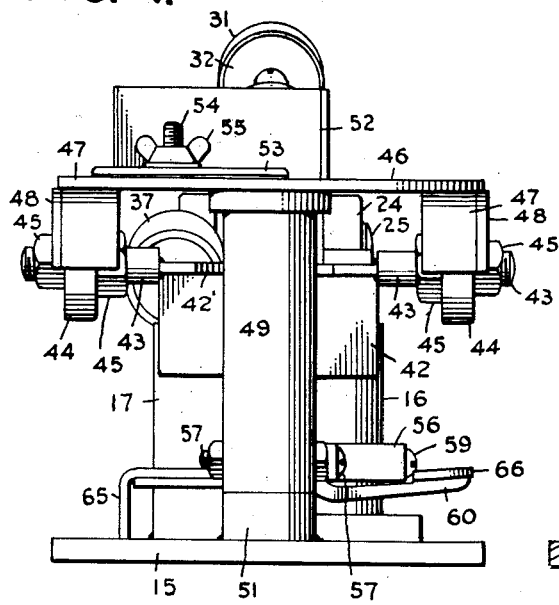
Figure 4 is an end view of the apparatus.
Figure 7:
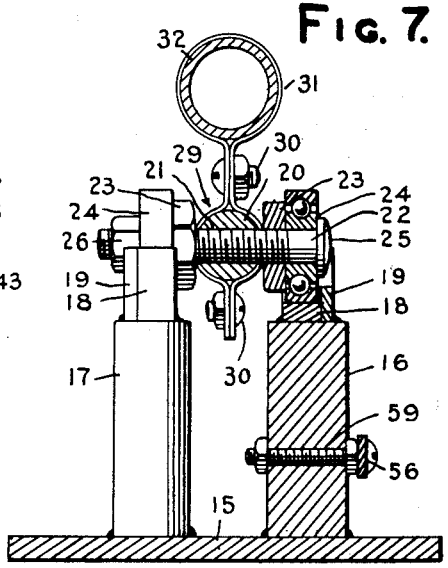
Figure 7 is a similar section on line 7—7 of Figure 1.

In the drawings, where for the purpose of illustration is shown a preferred embodiment of the invention, the numeral 15 designates a flat horizontal base plate or support for the apparatus. Fixedly secured to the base plate 15 at a selected point along the same, and inwardly of its opposite longitudinal edges are a pair of uprights or standards 16 and 17 which are spaced apart somewhat, as shown in Figures 3 and 7. The lower ends of the standards 16 and 17 may be rigidly secured to the base plate 15 by welding or the like. Rigidly secured to the tops of the standards 16 and 17 are generally U-shaped bearings or pillow blocks 18, substantially L-shaped in cross section, Figure 7, and including outer vertical flanges or side walls 19 integral therewith. The pillow blocks 18 are arranged in transverse or axial alignment, at the same elevation, and form with the standards 16 and 17 the main fulcrum or pivotal supporting means for the apparatus.

Arranged between the bearings 18, at substantially the elevation of the same, and extending longitudinally of the support plate 15 is a scale beam or bar 20, having a transverse opening 21 formed therein between its ends, for receiving a horizontal transverse bolt 22, Figure 7. The bolt 22 extends transversely beyond the opposite sides of the scale beam 20 to form trunnions for the scale beam. The bolt 22 may be rigidly locked to the beam 20 by lock nuts 23, mounted thereon adjacent to the opposite sides of the beam, and also serving to position axially a pair of ball bearings 24, mounted upon the bolt 22 inwardly of its head 25 and the nut 26, carried by the other end of the bolt. The ball bearings 24 are thus held against axial movement upon the bolt 22, and the ball bearings have their outer races seated within the U-shaped bearings 18, as shown. The side flanges 19 of the pillow blocks prevent the scale beam 20 and associated elements from shifting laterally with respect to the standards 16 and 17. The arrangement provides a free and substantially frictionless pivotal mounting for the scale beam 20, which is adapted to swing vertically during the operation of the apparatus.

Figure 1:
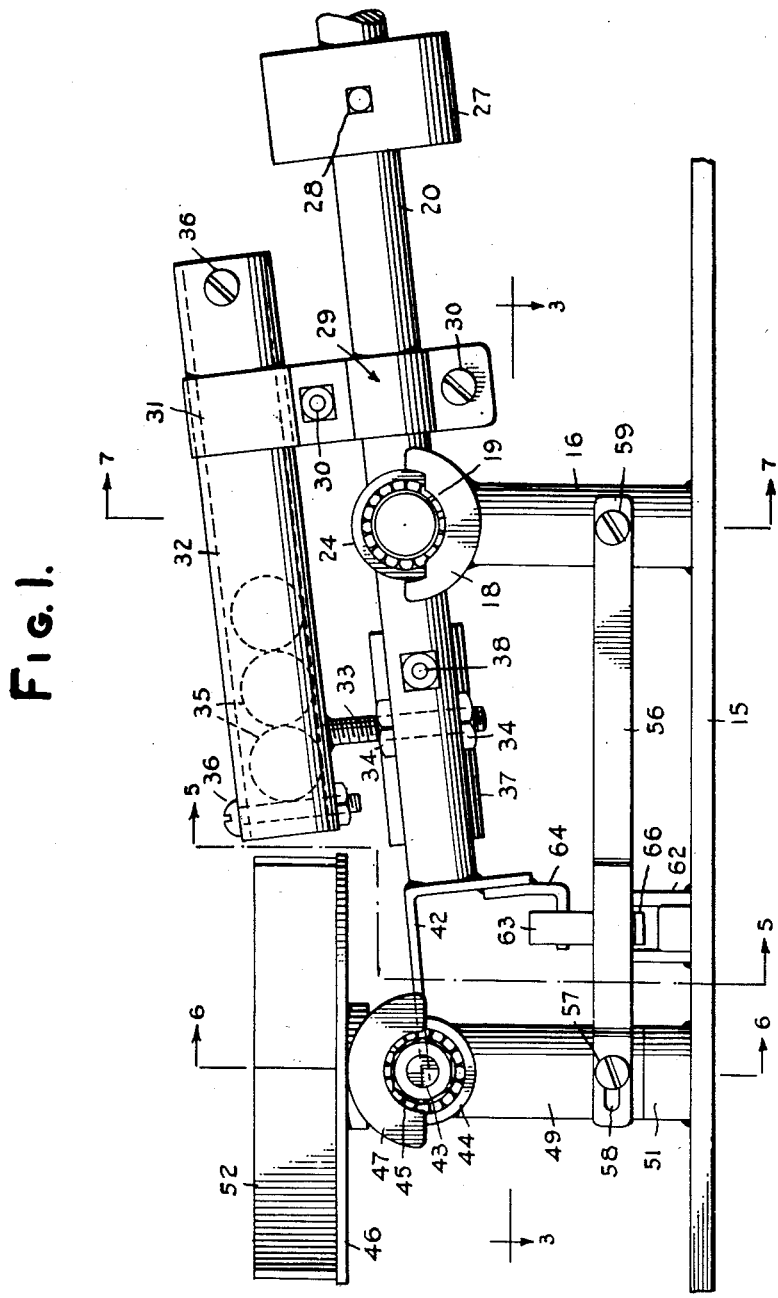

The beam 20 extends longitudinally rearwardly of or to the right of the standards 16 and 17, Figure 1, for any preferred distance, and is provided with a longitudinally adjustable counter weight 27, held in place by a set screw 28 or the like. Forwardly of the counter weight 27, and near the rear sides of the pillow blocks 18, a split sheet metal clamp or bracket 29 surrounds the beam 20 and is rigidly clamped thereto by screws 30, arranged above and below the beam 20. The bracket 29 has a top cylindrical clamping extension or sleeve 31, integral therewith, and receiving a longitudinal tube 32, disposed above the beam 20 in spaced superposed relation therewith. The clamping sleeve 31 tightly grips the tube 32 near its rear end, Figure 1, and the forward end of the tube is rigidly supported by a screw threaded leg or stud 33, welded or otherwise rigidly secured to the lower side of the tube 32 and extending through an opening formed in the beam 20. The stud 33 is rigidly secured to the scale beam 20 by means of lock nuts 34, arranged above and below the scale beam and this arrangement provides means for adjusting the forward end of the tube 32 vertically slightly with respect to the beam 20. As shown in Figure 1, the tube 32 is generally parallel to the beam 20 but has its forward end converging slightly toward the forward end of the beam for a purpose to be described. Loosely mounted within the tube 32, and free to roll longitudinally therein is a plurality of ball weights 35, preferably three in number, as shown in Figure 1. The ball weights 35 are held captive within the tube 32 by means of end transverse bolts or stops 36, rigidly secured within openings formed in the tube near its opposite ends.

Arranged adjacent to one side of the scale beam 20 near and forwardly of the standards 16 and 17 and below the forward portion of the tube 32, is a cylindrical mercury switch 37 of a preferred conventional type, and secured bodily to the beam 20 by a bolt 38 or the like, Figure 1. The mercury switch 37 has its longitudinal axis parallel with the longitudinal axis of the beam 20, as shown, and the switch may be adjusted angularly about the axis of the transverse bolt 38 and locked into selected adjusted position, when desired. The mercury switch 37 contains a quantity 39 of mercury and has a pair of fixed terminals 40 and 41, Figure 9, arranged to contact the mercury and complete a circuit therethrough when the switch is tilted in one direction with the beam 20 and the mercury 39 collects near one end of the switch.

The beam 20 extends a slight distance forwardly of the mercury switch 37, and has rigidly secured to its forward end by welding or the like a rigid L-shaped member or bracket 42. The top portion of the bracket 42 projects longitudinally forwardly of the beam 20 and has rigidly secured to its forwardmost corners by welding or the like a pair of horizontal transverse screw threaded shafts or trunnions 43. These trunnions 43 are arranged at the same elevation and are in axial alignment, and project laterally beyond the opposite sides of the bracket 42. A pair of ball bearings 44 are mounted upon the trunnions 43 and secured in place against axial movement by pairs of lock nuts 45.

A horizontal weighing table or platform 46 is arranged above the L-shaped bracket 42 and ball bearings 44, and forwardly of the tube 32. This table 46 is flat and circular, as shown, and has rigidly secured to its lower side at diametrically opposite points by welding or the like, inverted generally U-shaped bearings or pillow blocks 47, L-shaped in cross section and including outer vertical flanges or side walls 48, preferably integral therewith. These inverted pillow blocks 47 are seated upon the tops of the ball bearings 44, and provide for the weighing platform 46 a substantially frictionless pivotal connection with the bracket 42 and scale beam 20.

Figure 2:
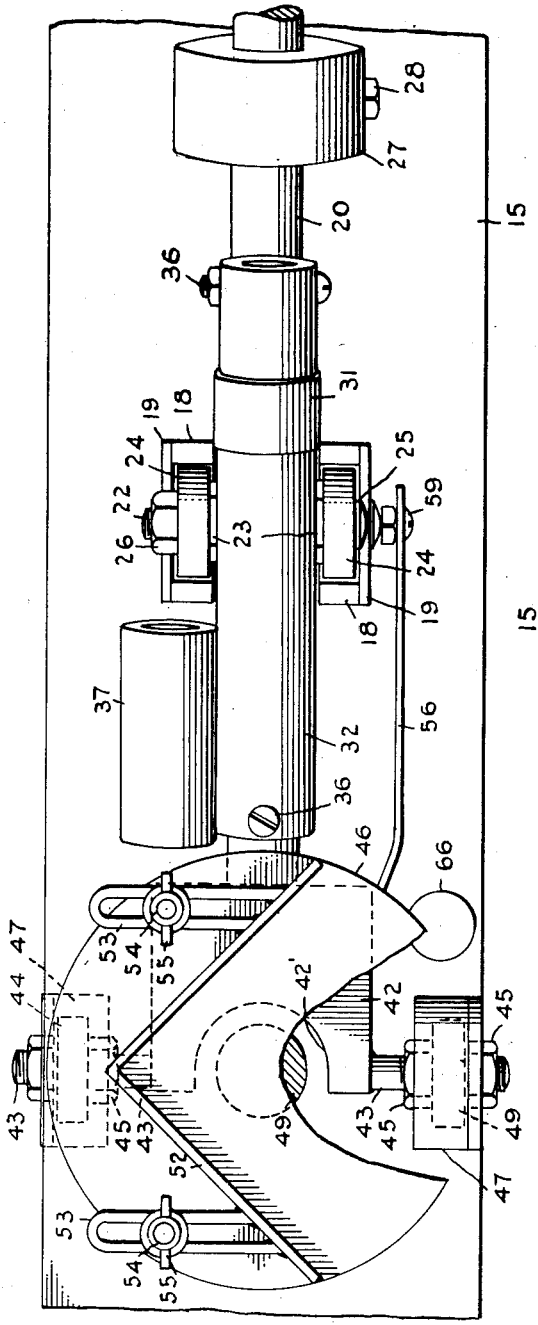
Figure 2 is a plan view of the same.

Rigidly secured to the bottom of the table 46 by welding or the like and depending from the center of the table is a vertical post or pedestal 49, having its lower end 50 terminating a substantial distance below the pillow blocks 47, as shown, and adapted to engage a low upstanding stop lug 51, rigidly mounted upon the base plate 15 directly below the pedestal 49. The table 46 and pedestal 49 are held against movement axially of the trunnions 43 by the vertical flanges 48 of the inverted pillow blocks 47. The L-shaped bracket 42 is provided in its leading edge with an arcuate notch or cutout 42', Figure 2, to provide clearance for the pedestal 49.

In order to conveniently adapt the weighing table 46 to different sizes of jars or receptacles, such as pint and quart jars and the like, I mount upon the table 46 an adjustable V-shaped abutment or wall 52, slidable thereon and having a pair of slotted extensions 53, rigidly secured thereto by welding or the like. The horizontal slotted extensions 53 receive upstanding screws 54, rigidly secured to the table 46 near its marginal edge, and these screws carry adjustable wing nuts 55 which are manipulated for adjusting the V-shaped abutment 52, and releasably locking the same in the selected adjusted position.

A horizontal longitudinal link or bar 56 is provided near the lower end of the pedestal 49 and having its forward end connected with the pedestal by means of a transverse bolt 57, engaging through a slot 58 of the link 56, and slidable therein. The bolt 57 is rigidly secured to the pedestal 49, as shown. The rear end of the link 56 is pivoted to the standard 16 by a bolt 59 or the like, and the link 56 is adapted to swing vertically about the bolt 59 when the beam 20 swings vertically upon its pivot or fulcrum. The link 56 forms with the beam 20, standard 16, and pedestal 49 a parallelogram type of linkage for maintaining the pedestal 49 vertical and the table 46 horizontal in all positions of the beam 20.

Means are provided to releasably hold the table 46 in the lowered position with the bottom of the pedestal 49 engaging the stop lugs 51. Such means comprises a transverse vertically swingable key lever 60, arranged near and above the base plate 15 and underneath the L-shaped bracket 42. The key lever 60 is pivotally secured near its longitudinal center, at 61 to an upstanding bracket or yoke 62, rigidly mounted upon the base plate 15, at the transverse center of the same. The key lever 60 has an upstanding latch extension 63 integral therewith near the pivot 61, for locking engagement with a depending substantially L-shaped element or keeper 64, rigidly secured by welding or the like to the bottom of the bracket 42. The key lever 60 carries a weight 65 at its end remote from the key top 66, for causing the key lever 60 and latch extension 63 to return to their positions shown in Figure 5, when the latch extension 63 is displaced to the right through engagement with the keeper 64 or when the key top 66 is depressed by the finger.

My apparatus is used in conjunction with liquid dispensing means for filling bottles or containers with liquid, such as the bottle 67 on the table 46 in Figure 9. The liquid dispensing means may comprise a faucet 68 having a valve 69 connected therein, and in turn, connected with a supply pipe 70, leading to a suitable source of supply for the liquid. The faucet 68 is bodily mounted upon a stationary upright or post 71, and is vertically adjustable thereon as required to accommodate a particular size of receptacle to be filled.

The stem 72 of the valve 69 is connected with and operated by a plunger 73 of a conventional solenoid 74, rigidly mounted upon a horizontal support plate 75, rigidly secured to the top of the post 71. The two terminals 40 and 41 of the mercury switch 37 are connected through wires 76 and 77 with the terminals of the coil of solenoid 74, Figure 9.

Figure 5:
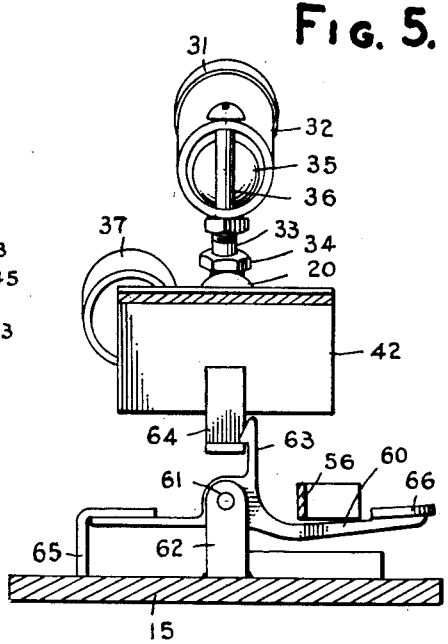
Figure 5 is a transverse vertical section substantially on line 5—5 of Figure 1.
Figure 6:
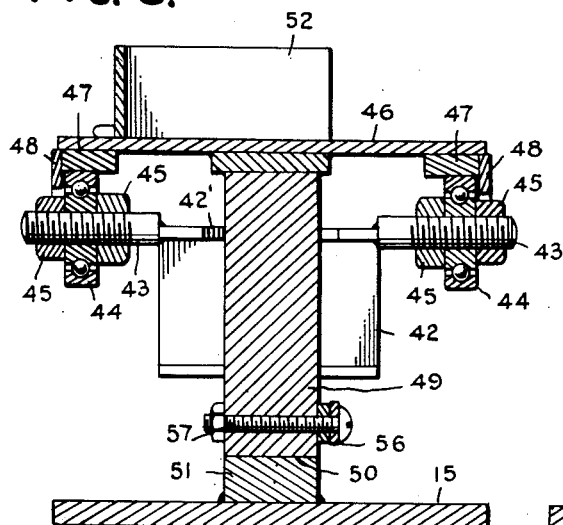
Figure 6 is a similar section on line 6—6 of Figure 1.

In operation, assuming that one filled receptacle 67, say of the pint size, has just been filled and removed from the table 46, the table will be in the lowermost latched position such as that shown in Figure 1, and the latch extension 63 will be holding the keeper 64 as indicated in Figure 5. In this position of the apparatus, the mercury switch 37 is inclined in the opposite direction from that shown in Figure 9, and the terminals 40 and 41 are out of contact with the mercury 39, and no circuit through the solenoid 74 is completed. The deenergized solenoid 74 is now maintaining the valve 69 closed, and no liquid is passing from the faucet 68.

The next empty pint receptacle 67 is now placed upon the lowered table 46, the V-shaped abutment 52 having previously been adjusted to properly center the container 67 upon the table 46. The key lever 60 is now depressed by means of the key top 66 and the latch extension 63 releases the keeper 64 so that the counterweight 27 causes the table 46 to begin to rise. When this occurs, the scale beam 20 and tube 32 will approach the horizontal, and then pass the horizontal when moving toward their relative positions of Figure 9. As soon as the tube 32 passes the horizontal, the ball weights 35 will immediately roll to the right hand end of the tube, Figure 9, and add to the effect of the counterweight 27 in elevating the table 46. This completes the elevation of the table 46 and the closing of the circuit through the mercury switch 37 with a relatively snappy action, and as soon as the mercury switch terminals 40 and 41 are bridged by the mercury 39, the circuit through the solenoid 74 is completed, and the solenoid becomes energized and opens the valve 69.

Liquid from the faucet 68 now enters the receptacle 67, and the table 46 begins to move downwardly. When the beam 20 approaches but not quite reaches the horizontal upon its return to the position of Figure 1, the ball weights 35 will roll to the left hand end of the tube 32, Figure 9, due to the slight convergence of the tube and beam 20. This will accelerate the lowering of the table 46, and assure positive engagement of the keeper 64 and latch extension 63 when the table 46 is fully lowered and the pedestal 49 contacts the stop lug 51. At this time, the mercury switch 37 is open, and the solenoid 74 is again de-energized so that the flow of liquid from the faucet 68 is cut off. The receptacle 67 on the table 46 is now completely filled and ready for removal from the table, so that the cycle of operation may be completed for the next empty receptacle.

The apparatus is efficient and substantially foolproof in operation. The arrangement of the over-center ball weights 35 in the tube 32 assures positive engagement of the latch extension 63 and keeper 64, as well as accelerated elevation of the table 46 with the empty receptacle. The mercury switch 37 provides an efficient automatic means for operating the electrical solenoid 74 and thereby regulating the flow of liquid from the faucet 68.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. Apparatus for filling and weighing receptacles comprising a support including spaced standards provided at their tops with bearings, a scale beam provided between its ends with trunnions seated within the bearings so that the scale beam is swingable vertically, a member secured to the scale beam near one end and having a locking part, trunnions carried by the member and extending on opposite sides of the same, a weighing table including bearings seated upon the last named trunnions and having a depending part, a link connecting said depending part of the table and one of said standards and serving to maintain the table level as it is raised and lowered with said scale beam, releasable latch means for engagement with said locking part to hold the table in a lowered position, movable over center weight means carried by the scale beam and extending on opposite sides of the trunnions of said scale beam for causing the table to rise and descend with a snappy action, and a gravity operated switch carried by the scale beam for operating liquid dispensing means above said table in response to raising and lowering of said table.

2. Apparatus for filling and weighing receptacles comprising a support including a pair of uprights, a vertically swingable scale beam provided between its ends with trunnions which are journaled upon the uprights, a member secured to one end of the scale beam, trunnions carried by the member, a vertically movable horizontal table having bearing parts journaled upon the trunnions of said member, a depending pedestal secured to the table and extending below said member and adapted to have its lower end engage the support, a latch device connected with the support and having a part engageable with said member for releasably locking the same in a lowered position with the lower end of the pedestal engaging the support, a counterweight mounted upon the scale beam near its end remote from said member, a tube extending longitudinally of the scale beam and substantially parallel therewith and secured to the scale beam, a longitudinally movable weight mounted within the tube for accelerating the movement of the scale beam when the same passes the horizontal, a mercury switch mounted upon the scale beam and having a pair of terminals which are bridged by the mercury when the scale beam is tilted for elevating the table, a fixed upright extending above the table and scale beam for a substantial distance, a dispensing faucet vertically adjustably mounted upon the fixed upright and having a discharge spout arranged over the table, a valve connected in said faucet and having a stem, a solenoid mounted upon the fixed upright and having a plunger connected with the valve stem for operating the same to open and close said valve, and wires connecting the terminals of the mercury switch and solenoid.

3. Apparatus of the class described comprising a base including spaced uprights, generally U-shaped bearings secured to the tops of the spaced uprights, a generally horizontal scale beam spaced above the base and provided between its ends with trunnions extending transversely thereof and journaled within the U-shaped bearings so that the scale beam is swingable vertically, a generally L-shaped member secured to one end of the scale beam and extending longitudinally forwardly of and below the scale beam, a substantially horizontal locking element carried by the lower end of the L-shaped member and spaced below the scale beam, trunnions secured to the L-shaped member near its forward end and extending transversely thereof beyond the opposite sides of the L-shaped member, a horizontal weighing table including a depending pedestal adapted to engage the base, generally inverted U-shaped bearings secured to the table near opposite sides of the same and pivotally engaging the last-named trunnions, a generally horizontal link pivotally connected near one end with one of said uprights and near its opposite end with the depending pedestal and serving to maintain the weighing table level as it is raised and lowered by the scale beam, a latch lever pivoted to said base and extending transversely of the scale beam near the forward end of the scale beam and having a locking part engageable over said substantially horizontal locking element to releasably hold the weighing table in a lowered position with the depending pedestal engaging the base, a tube secured to the scale beam and substantially parallel therewith and extending upon opposite sides of the trunnions of the scale beam, a weight movably mounted within the tube for causing the weighing table to rise and descend with a snappy action whenever the tube is tilted from the horizontal, and a gravity operated switch bodily mounted upon the scale beam for completing a circuit when the weighing table is elevated to operate liquid dispensing means arranged above the table.

4. Apparatus of the class described comprising a base including spaced uprights, generally U-shaped bearings secured to the tops of the spaced uprights, a generally horizontal scale beam spaced above the base and provided between its end with trunnions extending transversely thereof, ball bearings carried by the trunnions and engaging the U-shaped bearings so that the scale beam is swingable vertically with minimum friction, a generally L-shaped member secured to one end of the scale beam and extending longitudinally forwardly of and below the scale beam, a locking element carried by the lower end of said L-shaped member, trunnions secured to the L-shaped member near its forward end and extending transversely beyond opposite sides thereof, ball bearings mounted upon the last-named trunnions, a horizontal weighing table including a depending pedestal adapted to engage the base, substantially inverted U-shaped bearings secured to the table near opposite sides of the same and engaging the last-named ball bearings, a generally horizontal link pivotally connected near one end with one of said uprights and near its opposite end with the depending pedestal and serving to maintain the weighing table level in all vertically adjusted positions, a latch device pivoted to the base near the forward end of the scale beam and engageable with said locking element to releasably hold the weighing table lowered with the depending pedestal engaging the base, movable over center weight means carried by the scale beam for causing the weighing table to rise and descend with a quick action, and a gravity operated switch bodily mounted upon the scale beam for operating liquid dispensing means above the weighing table in response to raising and lowering of the table.

ANSEL R. MEADORS, Jr.

References Cited in the file of this patent

UNITED STATES PATENTS

| Number | Name | Date |
|---|---|---|
| 601,674 | Olin | Apr. 5, 1898 |
| 605,127 | Olin | June 7, 1898 |
| 616,857 | Richards | Dec. 27, 1898 |
| 748,055 | Driver | Dec. 29, 1903 |
| 1,087,838 | Scott | Feb. 17, 1914 |
| 1,835,223 | Kilpper | Dec. 8, 1931 |
| 2,273,180 | De Castro | Feb. 17, 1942 |

FOREIGN PATENTS

| Number | Country | Date |
|---|---|---|
| 356,015 | Great Britain | Sept. 3, 1931 |